(12) United States Patent
Chuang et al.

(10) Patent No.: US 9,354,738 B2
(45) Date of Patent: May 31, 2016

(54) TOUCH PANEL ASSEMBLY AND ELECTRONIC APPARATUS

(71) Applicant: HTC Corporation, Taoyuan County (TW)

(72) Inventors: I-Cheng Chuang, Taoyuan County (TW); Shih-Po Chien, Taoyuan County (TW); Yi-Ting Liu, Taoyuan County (TW); Chia-Hsiung Peng, Taoyuan County (TW); Chi-Jer Wang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 479 days.

(21) Appl. No.: 13/762,352

(22) Filed: Feb. 7, 2013

(65) Prior Publication Data

US 2014/0218629 A1 Aug. 7, 2014

(51) Int. Cl.
*G02F 1/1333* (2006.01)
*G06F 3/041* (2006.01)
*G06F 3/045* (2006.01)

(52) U.S. Cl.
CPC .......... *G06F 3/0416* (2013.01); *G02F 1/13338* (2013.01); *G06F 3/041* (2013.01); *G06F 3/045* (2013.01)

(58) Field of Classification Search
CPC ... G06F 3/041; G06F 3/0416; G02F 1/13338; G02F 2001/13312
USPC ..................................... 349/12; 345/173, 174
See application file for complete search history.

(56) References Cited

U.S. PATENT DOCUMENTS

| 2009/0122026 A1* | 5/2009 | Oh ................................ 345/174 |
| 2011/0304566 A1* | 12/2011 | Han .............................. 345/173 |
| 2012/0268402 A1* | 10/2012 | Wang et al. ................... 345/173 |
| 2015/0092120 A1* | 4/2015 | Wang ..................... G06F 3/041 349/12 |

FOREIGN PATENT DOCUMENTS

| TW | 200813795 | 3/2008 |
| TW | 200909912 | 3/2009 |
| TW | 200921484 | 5/2009 |
| TW | 201109778 | 3/2011 |
| TW | M430021 | 5/2012 |

* cited by examiner

*Primary Examiner* — Dung Nguyen
(74) *Attorney, Agent, or Firm* — Jianq Chyun IP Office

(57) ABSTRACT

A touch panel assembly includes a touch panel and a flexible circuit board. The touch panel includes a sensing array having sensing units, first connection lines, second connection lines, at least one input element, and pads. The first and second connection lines are outside the sensing array and electrically connected to the sensing units respectively. The input element is outside the sensing array and close to a side of the touch panel. The pads are in a bonding region of the touch panel and electrically connected to the first and second connection lines respectively. The bonding region is close to the side of the touch panel and is arranged along with the input element in parallel to the side of the touch panel. The flexible circuit board has a connecting portion extended and attached to the bonding region. Terminals of the connecting portion are electrically connected to the pads respectively.

16 Claims, 8 Drawing Sheets

TOUCH PANEL ASSEMBLY AND ELECTRONIC APPARATUS

BACKGROUND OF THE APPLICATION

1. Field of the Application

The present application generally relates to a touch panel assembly and an electronic apparatus, and more particularly, to a capacitive touch panel assembly and an electronic apparatus using the same.

2. Description of Related Art

Along with the rapid development and widespread of information technology, wireless mobile communications, and information appliance in recent years, the conventional input devices (for example, keyboards and mouses) of many information products have been replaced by touch panels in order to provide a more convenient, light-weighted, and intuitional experience to the users.

Touch panels can be categorized into resistive touch panels, capacitive touch panels, optical touch panels, acoustic wave touch panels, and electromagnetic touch panels according to the touch-sensing techniques adopted by these touch panels. Compared to other types of touch panels, capacitive touch panels offer shorter response time, higher reliability, and higher definition therefore are broadly applied to various handheld electronic apparatuses.

In a capacitive touch panel, a plurality of staggered electrodes constitutes a sensing array for achieving a surface sensing effect. When a user touches the touch panel with his finger, the touch panel determines the position touched by the user's finger according to capacitance variation on the sensing array.

However, peripheral circuits of the touch panel or wires for connecting the electrodes take up layout space on the touch panel. Besides, a pad bonding region should be reserved around the touch panel to allow external circuits (for example, a flexible circuit board) to be electrically connected to the sensing array, so that driving signals can be input and sensing signals can be output.

SUMMARY OF THE APPLICATION

Accordingly, the present application is directed to a touch panel assembly, in which the peripheral layout space of a touch panel is effectively used so that the size of the touch panel is reduced, and the manufacturing cost thereof is lowered.

The present application is directed to an electronic apparatus using the touch panel assembly mentioned above, in which available layout space inside the electronic apparatus is increased so that the surrounding border of the electronic apparatus is reduced and the display area thereof is enlarged.

A touch panel assembly of the present application includes a touch panel and a flexible circuit board. The touch panel includes a sensing array, a plurality of first connection lines, a plurality of second connection lines, at least one input element, and a plurality of pads. The sensing array includes a plurality of sensing units. The first connection lines and the second connection lines are disposed outside the sensing array and are respectively and electrically connected to the corresponding sensing units to enable the sensing units. The input element is disposed outside the sensing array and close to a side of the touch panel. The pads are disposed in a bonding region of the touch panel and are respectively and electrically connected to the corresponding first connection lines and second connection lines. The bonding region is close to the side of the touch panel. The bonding region and the input element are arranged along a direction parallel to the side of the touch panel. The flexible circuit board has a connecting portion extended and attached to the bonding region. The connecting portion has a plurality of terminals respectively and electrically connected to the pads.

An electronic apparatus of the present application includes a casing, a main module, a display module, a touch panel, a flexible circuit board, and a transparent cover. The casing has an opening. The main module is disposed in the casing. The display module is disposed in the casing, and the opening exposes a display surface of the display module. The touch panel is disposed on the display surface and includes a sensing array, a plurality of first connection lines, a plurality of second connection lines, at least one input element, and a plurality of pads. The sensing array includes a plurality of sensing units. The first connection lines and the second connection lines are disposed outside the sensing array and are respectively and electrically connected to the corresponding sensing units to enable the sensing units. The input element is disposed outside the sensing array and close to a side of the touch panel. The pads are disposed in a bonding region of the touch panel and are respectively and electrically connected to the corresponding first connection lines and second connection lines. The bonding region is close to the side of the touch panel. The bonding region and the input element are arranged along a direction parallel to the side of the touch panel. The flexible circuit board is electrically connected between the main module and the touch panel. The flexible circuit board has a connecting portion extended and attached to the bonding region. The connecting portion has a plurality of terminals respectively and electrically connected to the pads. The transparent cover is disposed on the touch panel and covers the opening.

As described above, in a touch panel assembly provided by the present application, pads are disposed at both sides of input elements, and the connecting portion of a flexible circuit board is extended to both sides of the input elements and bonded with the pads. Thus, layout space surrounding a touch panel can be effectively used, so that the circuit layout of the touch panel can be made very compact, the size of the touch panel can be reduced, and the manufacturing cost thereof can be lowered. In addition, by adopting the touch panel assembly, the available layout space inside an electronic apparatus can be increased, the surrounding border of the electronic apparatus can be reduced, and the display area of the electronic apparatus can be enlarged.

These and other exemplary embodiments, features, aspects, and advantages of the application will be described and become more apparent from the detailed description of exemplary embodiments when read in conjunction with accompanying drawings.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
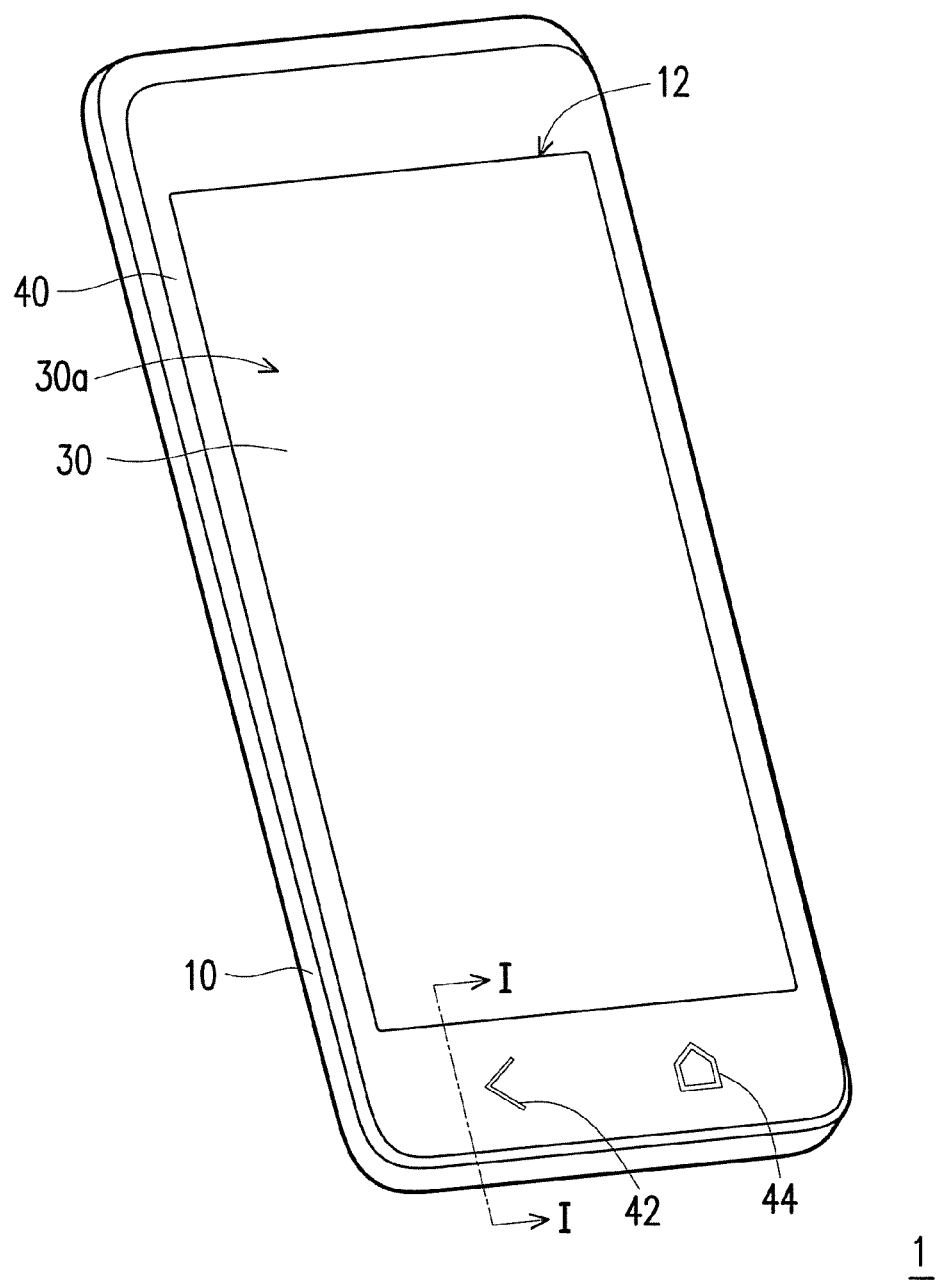
FIG. 1 is a perspective view of an electronic apparatus according to an embodiment of the application.

Reference will now be made in detail to the present preferred embodiments of the application, examples of which are illustrated in the accompanying drawings. Wherever possible, the same reference numbers are used in the drawings and the description to refer to the same or like parts.

The design provided by the application is suitable for an electronic apparatus, such as a mobile phone, a tablet PC, or an eBook. Following embodiments will be described by taking a mobile phone as an example.

Figure 2:
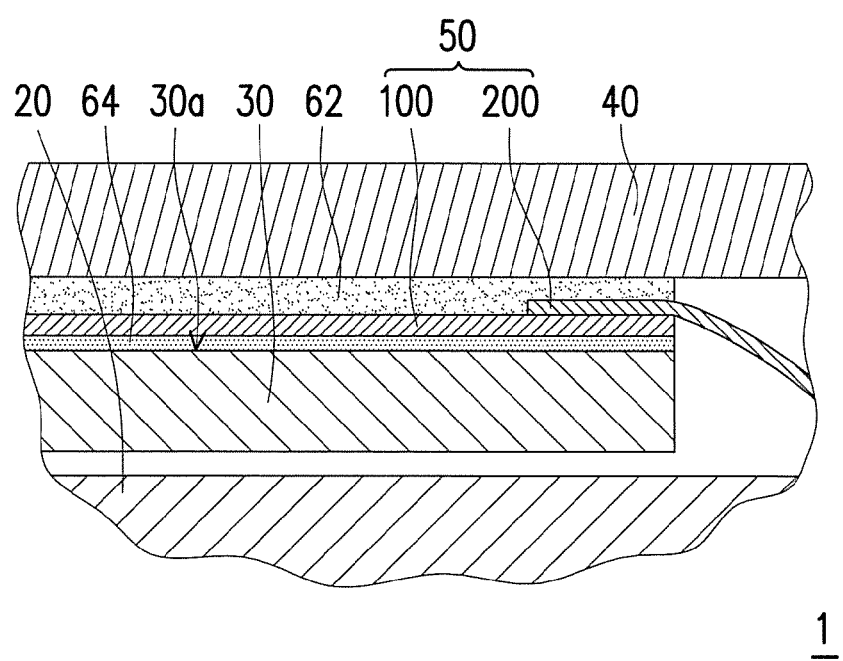
FIG. 2 is a partial cross-sectional view of the electronic apparatus of FIG. 1 along line I-I.

FIG. 1 is a perspective view of an electronic apparatus according to an embodiment of the application. FIG. 2 is a partial cross-sectional view of the electronic apparatus of FIG. 1 along line I-I. Referring to FIG. 1 and FIG. 2, the electronic apparatus 1 in the present embodiment includes a casing 10, a main module 20, a display module 30, a touch panel 100, a flexible circuit board 200, and a transparent cover 40. The casing 10 has an opening 12. The main module 20 is disposed in the casing 10. The display module 30 is disposed in the casing 10, and the opening 12 exposes a display surface 30a of the display module 30. The touch panel 100 is disposed on the display surface 30a, and the flexible circuit board 200 is bent and electrically connected to the main module 20 and the touch panel 100. The transparent cover 40 is disposed on the touch panel 100 and covers the opening 12 of the casing 10. The transparent cover 40 has a first transmissive pattern 42 and a second transmissive pattern 44. The first transmissive pattern 42 and the second transmissive pattern 44 can be used as key patterns.

Additionally, the touch panel 100 and the flexible circuit board 200 can be assembled together to form a touch panel assembly 50, such that the touch panel 100 and the flexible circuit board 200 can be assembled to the electronic apparatus 1 conveniently. Moreover, the electronic apparatus 1 further includes a first optically clear adhesive 62 and a second optically clear adhesive 64. The first optically clear adhesive 62 is disposed between the transparent cover 40 and the touch panel 100, and the second optically clear adhesive 64 is disposed between the touch panel 100 and the display module 30. After the touch panel assembly 50 is assembled into the casing 10, the first optically clear adhesive 62 bonds the transparent cover 40 and the touch panel 100, and the second optically clear adhesive 64 bonds the display module 30 and the touch panel 100. Furthermore, the main module 20 in the present embodiment is composed of a motherboard (not shown) and a processor (not shown).

Figure 3:
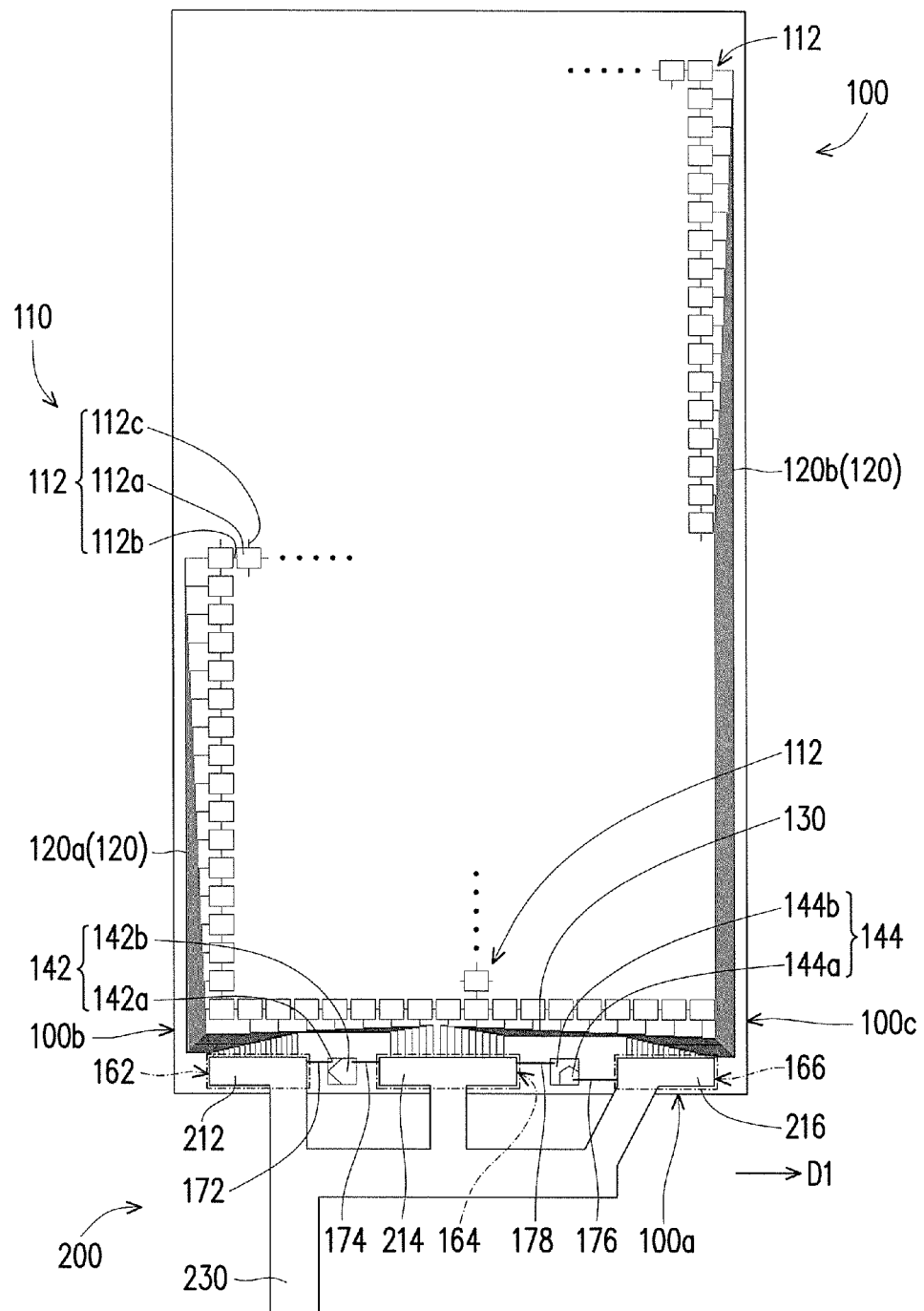
FIG. 3 is a front view of a touch panel assembly of FIG. 2.
Figure 4:
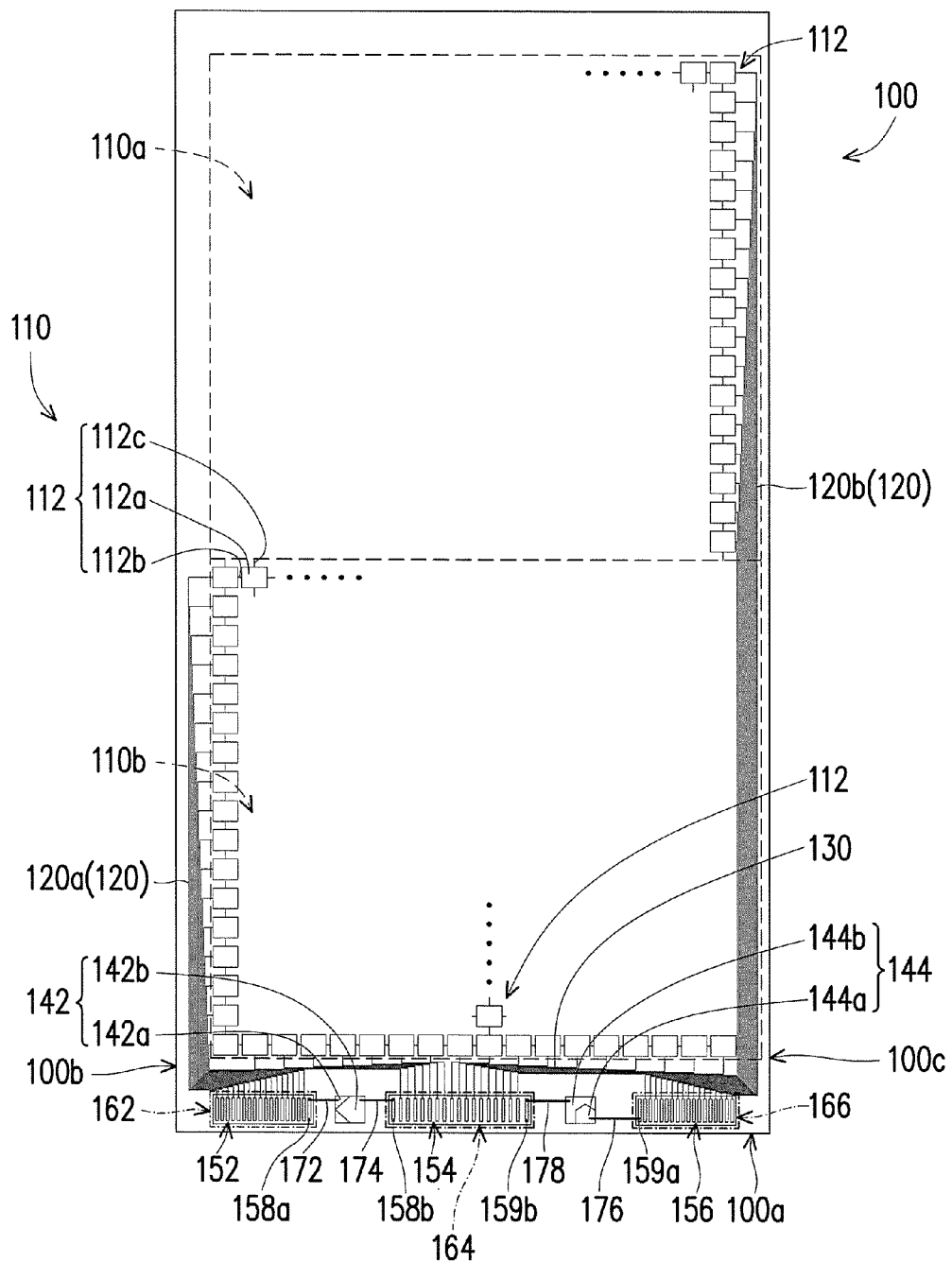
FIG. 4 is a front view of a touch panel of FIG. 3.
Figure 5:
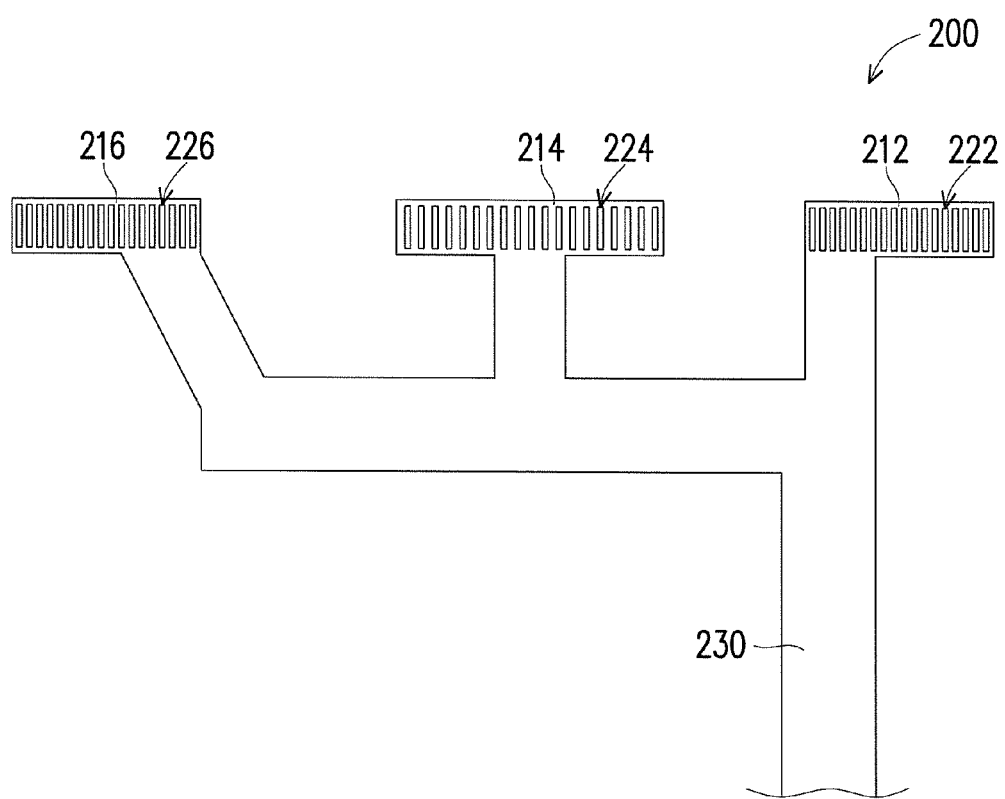
FIG. 5 is a rear view of a flexible circuit board of FIG. 3.

FIG. 3 is a front view of a touch panel assembly of FIG. 2. FIG. 4 is a front view of a touch panel of FIG. 3. FIG. 5 is a rear view of a flexible circuit board of FIG. 3. Referring to FIG. 3, FIG. 4, and FIG. 5, the touch panel 100 includes a sensing array 110, a plurality of first connection lines 120, a plurality of second connection lines 130, a first input element 142, a second input element 144, first pads 152, second pads 154, and third pads 156. The sensing array 110 includes a plurality of sensing units 112. The first connection lines 120 and the second connection lines 130 are outside the sensing array 110 and are respectively and electrically connected to the corresponding sensing units 112 to enable the sensing units 112.

The first input element 142 and the second input element 144 are outside the sensing array 110 and close to a side 100a of the touch panel 100. The first input element 142 and the second input element 144 may be virtual keys, physical keys, light sensitive keys, or strength sensitive keys on a mobile phone. The first input element 142 and the second input element 144 are respectively located below the first transmissive pattern 42 (as shown in FIG. 1) and the second transmissive pattern 44 (as shown in FIG. 1), and the first input element 142 and the second input element 144 respectively offer different functions (for example, returning to the previous page or returning to the home page).

The first pads 152, the second pads 154, and the third pads 156 are respectively disposed in a first bonding region 162, a second bonding region 164, and a third bonding region 166 of the touch panel 100 and are respectively and electrically connected to the corresponding first connection lines 120 and second connection lines 130. The first bonding region 162, the second bonding region 164, and the third bonding region 166 are close to the side 100a of the touch panel 100, and the first bonding region 162, the second bonding region 164, the third bonding region 166, the first input element 142, and the second input element 144 are alternatively arranged along a direction D1 parallel to the side 100a of the touch panel 100, where the first input element 142 is between the first bonding region 162 and the second bonding region 164, and the second input element 144 is between the second bonding region 164 and the third bonding region 166.

In addition, the flexible circuit board 200 has a first connecting portion 212, a second connecting portion 214, a third connecting portion 216, and a body 230. The first connecting portion 212, the second connecting portion 214, and the third connecting portion 216 are extended and attached to the corresponding first bonding region 162, second bonding region 164, and third bonding region 166. The body 230 is connected to the first connecting portion 212, the second connecting portion 214, and the third connecting portion 216, and the body 230 can be bent relative to the first connecting portion 212, the second connecting portion 214, and the third connecting portion 216 so that the flexible circuit board 200 and the main module 20 (as shown in FIG. 2) can be assembled.

As described above, multiple first terminals 222 are located at the first connecting portion 212 and electrically connected to the first pads 152 respectively in the first bonding region 162. Multiple second terminals 224 are located at the second connecting portion 214 and electrically connected to the second pads 154 respectively in the second bonding region 164. Multiple third terminals 226 are located at the third connecting portion 216 and electrically connected to the third pads 156 respectively in the third bonding region 166.

To be specific, the first pads 152, the second pads 154, and the third pads 156 are respectively disposed in the first bonding region 162, the second bonding region 164, and the third bonding region 166. The first bonding region 162, the second bonding region 164, the third bonding region 166, the first input element 142, and the second input element 144 are alternatively arranged along the direction D1. And, the first connecting portion 212, the second connecting portion 214, and the third connecting portion 216 of the flexible circuit board 200 are respectively extended to both sides of the first input element 142 and both sides of the second input element 144 and are respectively bonded to the first pads 152, the second pads 154, and the third pads 156. Thus, spaces at both sides of the first input element 142 and both sides of the second input element 144 can be used for disposing the first connecting portion 212, the second connecting portion 214, and the third connecting portion 216. Accordingly, the layout space around the touch panel 100 can be effectively used, so that the layout of the touch panel 100 can be made very compact, the size of the touch panel 100 can be reduced, and the manufacturing cost of the touch panel assembly 50 can be lowered. Additionally, by applying the touch panel assembly 50, the available layout space in the electronic apparatus 1 is increased, so that the surrounding border of the electronic apparatus 1 is reduced and the display area of the electronic apparatus 1 is enlarged. However, the number of bonding regions is not limited to 3, which will be explained below with an example.

In another embodiment, the bonding region is composed of the first bonding region 162 and the second bonding region 164. The input element is between the first bonding region 162 and the second bonding region 164, the first pads 152 are in the first bonding region 162, and the second pad 154 are in the second bonding region 164. With such a structure, the circuit layout of the touch panel 100 can still be made very compact.

It should be noted that in the present application, there may be one or more input elements, and the number of the connecting portions may be one or more in accordance with the number of the input elements, and the circuit layout of a touch panel can still be made very compact by disposing the pads beside the input elements and extending the connecting portions to the sides of the input elements to be bonded with the pads. However, the numbers of the input elements and the connecting portions are not limited in the present application, and a user can adjust the numbers of the input elements and the connecting portions according to the actual application requirement. In addition, in the present application, the terminals of the connecting portion can be concentrated first and then extended out of the touch panel, which will be explained below with an example.

Figure 6:
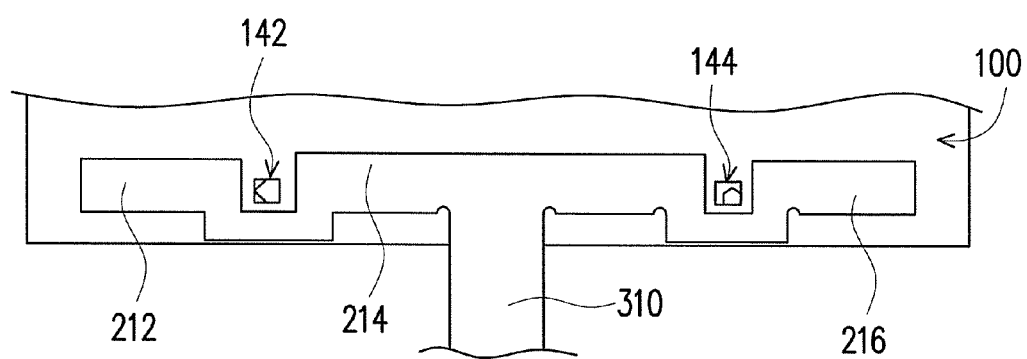
FIG. 6 is a partial view of a touch panel assembly according to another embodiment of the application.
Figure 7:
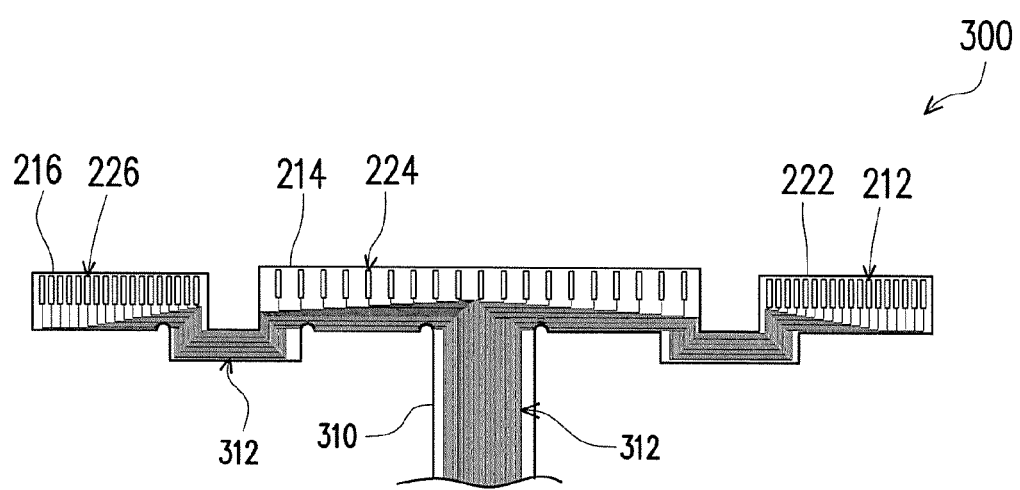
FIG. 7 is a rear view of a flexible circuit board of FIG. 6.

FIG. 6 is a partial view of a touch panel assembly according to another embodiment of the application. FIG. 7 is a rear view of a flexible circuit board of FIG. 6. Referring to FIG. 6 and FIG. 7, the touch panel assembly 50a in the present embodiment is similar to the touch panel assembly 50 illustrated in FIG. 3, wherein the like elements are referred with like reference numerals and will not be described herein. In the present embodiment, the flexible circuit board 300 further includes a line-concentrating portion 310. The line-concentrating portion 310 is extended from outside the touch panel 100 onto the touch panel 100, and after entering the touch panel 100, the line-concentrating portion 310 is extended on the touch panel 100 and respectively connected to the first connecting portion 212, the second connecting portion 214, and the third connecting portion 216. Besides, a plurality of wires 312 arranged in parallel on the line-concentrating portion 310 fans out after they enter the touch panel 100 and is respectively connected to the first terminals 222, the second terminals 224, and the third terminals 226.

Figure 8:
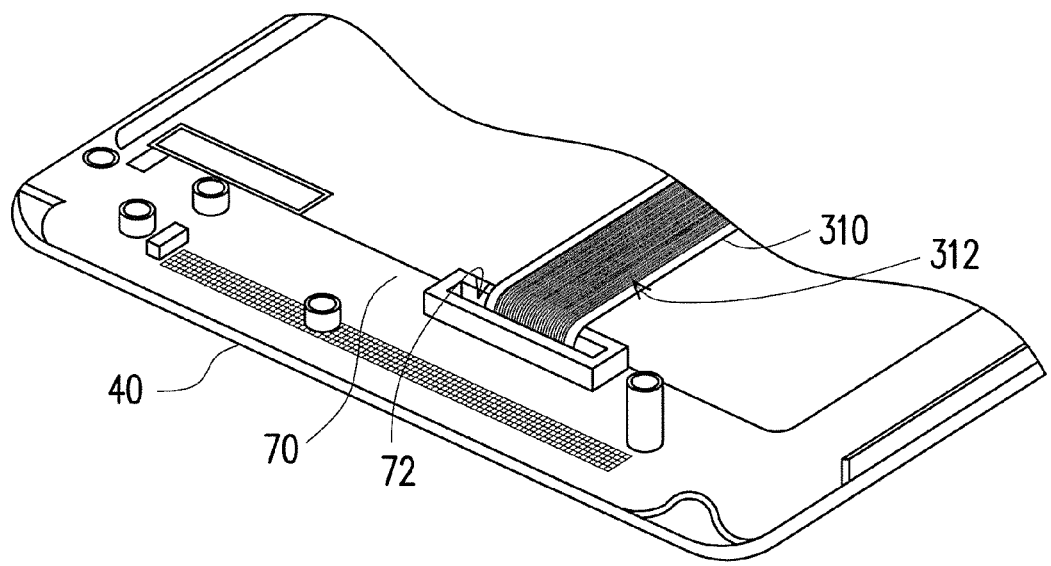
FIG. 8 is an assembled view of the touch panel assembly and a frame of FIG. 6.

FIG. 8 is an assembled view of the touch panel assembly and a frame of FIG. 6. Referring to FIG. 6, FIG. 7, and FIG. 8, in the present embodiment, the electronic apparatus 1 further includes a frame 70. The frame 70 is disposed at the opening 12 of the casing 10 (as shown in FIG. 1) and has an aperture 72. After the first terminals 222, the second terminals 224, and the third terminals 226 are respectively connected to the corresponding wires 312 and lapped to the first pads 152, the second pads 154, and the third pads 156, an assembly operator can pass the line-concentrating portion 310 of the flexible circuit board 300 through the through aperture 72 of the frame 70 and electrically connect it with the main module 20 (as shown in FIG. 2). Because the terminals of the flexible circuit board 300 are concentrated to one point, the number and size of broken holes on the frame 70 corresponding to those on the flexible circuit board 300 can be reduced. Thus, the structural strength of the frame 70 and the reliability and mechanical strength of the electronic apparatus 1 can be maintained. Additionally, in the present embodiment, the aperture 72 of the frame 70 is disposed at the center of the frame 70, while in another embodiment, the aperture 72 of the frame 70 may be disposed at one or the other side of the frame 70 or at any other possible position, and line-concentrating portion 310 of the flexible circuit board 300 is disposed corresponding to the aperture 72 of the frame 70.

Referring to FIG. 3 and FIG. 4, in the present embodiment, the sensing units 112 may be of different types. For example, each sensing unit 112 includes an electrode pad 112a and a transmitter 112b and a receiver 112c that are disposed in a staggered way. The electrode pad 112a includes a driving electrode (not shown) and a sensing electrode (not shown), the first connection lines 120 are electrically connected to the corresponding transmitters 112b and driving electrodes, and the second connection lines 130 are electrically connected to the corresponding receivers 112c and sensing electrodes.

To be specific, in the present embodiment, the sensing units 112 can be grouped into an upper block 110a and a lower block 110b. The sensing units 112 in the lower block 110b are connected to the corresponding first pads 152 by the first connection lines 120 of a first portion 120a disposed at a first side 100b, and the sensing units 112 in the upper block 110a are connected to the corresponding third pads 156 by the first connection lines 120 of a second portion 120b disposed at a second side 100c. Thus, the layout space of the first connection lines 120 on the touch panel 100 can be reduced by grouping the sensing units 112 into two blocks and connecting the sensing units 112 to the corresponding bonding regions and pads through connection lines disposed at both sides. Accordingly, the size of the touch panel 100 is reduced, the surrounding border of the electronic apparatus 1 is reduced, and the display area of the electronic apparatus 1 is enlarged.

Additionally, according to the present application, the sensing units 112, the first connection lines 120, the second connection lines 130, the first pads 152, the second pads 154, and the third pads 156 may be fabricated at one or the other side of a substrate (not shown) of the touch panel 100, or may also be respectively fabricated on two substrates (not shown). Thus, a user can adjust the manufacturing pattern of the touch panel 100 according to the actual application requirement.

Referring to FIG. 3 and FIG. 4, in the present embodiment, the first input element 142 and the second input element 144 may respectively be a virtual key. To be specific, the first input element 142 includes a first key electrode 142a and a second key electrode 142b. The first key electrode 142a and the second key electrode 142b are respectively and electrically connected to a first keypad 158a through a first key connection line 172 and to a second keypad 158b through a second key connection line 174. The first keypad 158a is in the first bonding region 162 and close to one side of the first input element 142. The second keypad 158b is in the second bonding region 164 and close to the other side of the first input element 142. The second input element 144 includes a third key electrode 144a and a fourth key electrode 144b. The third key electrode 144a and the fourth key electrode 144b are respectively and electrically connected to a third keypad 159a through a third key connection line 176 and a fourth keypad 159b through a fourth key connection line 178. The third keypad 159a is in the third bonding region 166 and close to one side of the second input element 144. The fourth keypad 159b is in the second bonding region 164 and close to the other side of the second input element 144. However, the input elements in the present application are not limited to aforementioned virtual keys, and in other embodiments, the input elements may also be physical keys, light sensitive keys, or strength sensitive keys.

When the first transmissive pattern 42 or the second transmissive pattern 44 is touched, a capacitance variation is produced between the first key electrode 142a and the second key electrode 142b, or another capacitance variation is produced between the third key electrode 144a and the fourth key electrode 144b. The electronic apparatus 1 (as shown in FIG. 1) starts the function corresponding to the first input element 142 or the second input element 144 according to this capacitance variation.

As described above, in a touch panel assembly provided by the present application, pads are disposed in bonding regions, the bonding regions and input elements are alternatively arranged in parallel, and the connecting portion of a flexible circuit board is extended to both sides of the input elements and bonded with the pads. Thus, the spaces beside the input elements can be used for disposing the connecting portion. Accordingly, the layout space surrounding the touch panel can be effectively used, so that the circuit layout of the touch panel can be made very compact, the size of the touch panel can be reduced, and the manufacturing cost of the touch panel assembly can be lowered. In addition, by adopting the touch panel assembly, the available layout space inside an electronic apparatus is increased, the surrounding border of the electronic apparatus is reduced, and the display area of the electronic apparatus is enlarged.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A touch panel assembly, comprising:
    a touch panel, comprising:
        a sensing array, comprising a plurality of sensing units;
        a plurality of first connection lines and a plurality of second connection lines, disposed outside the sensing array, and respectively and electrically connected to the corresponding sensing units to enable the sensing units;
    at least one input element, disposed outside the sensing array and close to a side of the touch panel, wherein the at least one input element comprises a first input element and a second input element; and
    a plurality of pads, disposed in a bonding region of the touch panel, and respectively and electrically connected to the corresponding first connection lines and the corresponding second connection lines, wherein the bonding region is close to the side of the touch panel, the bonding region and the at least one input element are substantially arranged along a direction parallel to the side, the bonding region comprises a first bonding region, a second bonding region, and a third bonding region, the first input element is disposed between the first bonding region and the second bonding region, the second input element is disposed between the second bonding region and the third bonding region, and the pads comprise a plurality of first pads in the first bonding region, a plurality of second pads in the second bonding region, and a plurality of third pads in the third bonding region; and
    a flexible circuit board, having a connecting portion, wherein the connecting portion is extended and attached to the bonding region, and a plurality of terminals of the connecting portion is respectively and electrically connected to the pads.

2. The touch panel assembly according to claim 1, wherein the first connection lines comprise a first portion and a second portion respectively at a first side and a second side of the touch panel, the first connection lines of the first portion are respectively and electrically connected to the first pads in the first bonding region, the first connection lines of the second portion are respectively and electrically connected to the third pads in the third bonding region, and the second connection lines are respectively and electrically connected to the second pads in the second bonding region.

3. The touch panel assembly according to claim 1, wherein the connecting portion of the flexible circuit board comprises:
    a first connecting portion, attached to the first bonding region, wherein the terminals comprise a plurality of first terminals on the first connecting portion, and the first terminals are respectively and electrically connected to the first pads in the first bonding region;
    a second connecting portion, attached to the second bonding region, wherein the terminals comprise a plurality of second terminals on the second connecting portion, and the second terminals are respectively and electrically connected to the second pads in the second bonding region; and
    a third connecting portion, attached to the third bonding region, wherein the terminals comprise a plurality of third terminals on the third connecting portion, and the third terminals are respectively and electrically connected to the third pads in the third bonding region.

4. The touch panel assembly according to claim 1, wherein the first input element is a virtual key and comprises a first key electrode and a second key electrode, the first key electrode and the second key electrode are respectively and electrically connected to a first keypad and a second keypad, the first keypad is in the first bonding region, and the second keypad is in the second bonding region, and the second input element is a virtual key and comprises a third key electrode and a fourth key electrode, the third key electrode and the fourth key electrode are respectively and electrically connected to a third keypad and a fourth keypad, the third keypad is in the third bonding region, and the fourth keypad is in the second bonding region.

5. The touch panel assembly according to claim 1, wherein the flexible circuit board further has a line-concentrating portion, the line-concentrating portion is extended from outside the touch panel onto the touch panel, and after the line-concentrating portion enters the touch panel, the line-concentrating portion is extended on the touch panel and connected to the connecting portion.

6. The touch panel assembly according to claim 5, wherein the bonding region comprises a first bonding region, a second bonding region, and a third bonding region, and the connecting portion of the flexible circuit board comprises:
    a first connecting portion, attached to the first bonding region, wherein the terminals comprise a plurality of first terminals on the first connecting portion, and the first terminals are respectively and electrically connected to the first pads in the first bonding region;
    a second connecting portion, attached to the second bonding region, wherein the terminals comprise a plurality of second terminals on the second connecting portion, and the second terminals are respectively and electrically connected to the second pads in the second bonding region; and a third connecting portion, attached to the third bonding region, wherein the terminals comprise a plurality of third terminals on the third connecting portion, and the third terminals are respectively and electrically connected to the third pads in the third bonding region, wherein a plurality of wires arranged in parallel on the line-concentrating portion fans out of the touch panel and is respectively connected to the first terminals, the second terminals, and the third terminals.

7. An electronic apparatus, comprising:

a casing, having an opening;

a main module, disposed in the casing;

a display module, disposed in the casing, wherein the opening exposes a display surface of the display module;

a touch panel, disposed on the display surface, wherein the touch panel comprises:

a sensing array, comprising a plurality of sensing units;

a plurality of first connection lines and a plurality of second connection lines, disposed outside the sensing array, and respectively and electrically connected to the corresponding sensing units to enable the sensing units;

at least one input element, disposed outside the sensing array and close to a side of the touch panel, wherein the at least one input element comprises a first input element and a second input element; and a plurality of pads, disposed in a bonding region of the touch panel, and respectively and electrically connected to the corresponding first connection lines and the corresponding second connection lines, wherein the bonding region is close to the side of the touch panel, the bonding region and the at least one input element are substantially arranged along a direction parallel to the side, the bonding region comprises a first bonding region, a second bonding region, and a third bonding region, the first input element is disposed between the first bonding region and the second bonding region, the second input element is disposed between the second bonding region and the third bonding region, and the pads comprise a plurality of first pads in the first bonding region, a plurality of second pads in the second bonding region, and a plurality of third pads in the third bonding region; and a flexible circuit board, electrically connected between the main module and the touch panel, wherein the flexible circuit board has a connecting portion, the connecting portion is extended and attached to the bonding region, and a plurality of terminals of the connecting portion is respectively and electrically connected to the pads.

8. The electronic apparatus according to claim 7 further comprising a transparent cover, wherein the transparent cover is disposed on the touch panel and covers the opening.

9. The electronic apparatus according to claim 7, wherein the first connection lines comprise a first portion and a second portion respectively at a first side and a second side of the touch panel, the first connection lines of the first portion are respectively and electrically connected to the first pads in the first bonding region, the first connection lines of the second portion are respectively and electrically connected to the third pads in the third bonding region, and the second connection lines are respectively and electrically connected to the second pads in the second bonding region.

10. The electronic apparatus according to claim 7, wherein the connecting portion of the flexible circuit board comprises:

a first connecting portion, attached to the first bonding region, wherein the terminals comprise a plurality of first terminals on the first connecting portion, and the first terminals are respectively and electrically connected to the first pads in the first bonding region;

a second connecting portion, attached to the second bonding region, wherein the terminals comprise a plurality of second terminals on the second connecting portion, and the second terminals are respectively and electrically connected to the second pads in the second bonding region; and a third connecting portion, attached to the third bonding region, wherein the terminals comprise a plurality of third terminals on the third connecting portion, and the third terminals are respectively and electrically connected to the third pads in the third bonding region.

11. The electronic apparatus according to claim 7, wherein the flexible circuit board further comprises a line-concentrating portion, the line-concentrating portion is extended from outside the touch panel onto the touch panel, and after the line-concentrating portion enters the touch panel, the line-concentrating portion is extended on the touch panel and connected to the connecting portion.

12. The electronic apparatus according to claim 11, wherein the bonding region comprises a first bonding region, a second bonding region, and a third bonding region, and the connecting portion of the flexible circuit board comprises:

a first connecting portion, attached to the first bonding region, wherein the terminals comprise a plurality of first terminals on the first connecting portion, and the first terminals are respectively and electrically connected to the first pads in the first bonding region;

a second connecting portion, attached to the second bonding region, wherein the terminals comprise a plurality of second terminals on the second connecting portion, and the second terminals are respectively and electrically connected to the second pads in the second bonding region; and a third connecting portion, attached to the third bonding region, wherein the terminals comprise a plurality of third terminals on the third connecting portion, and the third terminals are respectively and electrically connected to the third pads in the third bonding region, wherein a plurality of wires arranged in parallel on the line-concentrating portion fans out of the touch panel and is respectively connected to the first terminals, the second terminals, and the third terminals.

13. The electronic apparatus according to claim 11, wherein the electronic apparatus further comprises a frame disposed at the opening, the frame has at least one aperture, and the line-concentrating portion of the flexible circuit board is passed through the aperture and is connected to the main module.

14. The electronic apparatus according to claim 7, wherein the first input element is a virtual key and comprises a first key electrode and a second key electrode, the first key electrode and the second key electrode are respectively and electrically connected to a first keypad and a second keypad, the first keypad is in the first bonding region, and the second keypad is in the second bonding region, and the second input element is a virtual key and comprises a third key electrode and a fourth key electrode, the third key electrode and the fourth key electrode are respectively and electrically connected to a third keypad and a fourth keypad, the third keypad is in the third bonding region, and the fourth keypad is in the second bonding region.

15. A touch panel assembly, comprising:
a touch panel, comprising:
- a sensing array, comprising a plurality of sensing units;
- a plurality of first connection lines and a plurality of second connection lines, disposed outside the sensing array, and respectively and electrically connected to the corresponding sensing units to enable the sensing units;
- at least one input element, disposed outside the sensing array and close to a side of the touch panel; and
- a plurality of pads, disposed in a bonding region of the touch panel, and respectively and electrically connected to the corresponding first connection lines and the corresponding second connection lines, wherein the bonding region is close to the side of the touch panel, the bonding region and the at least one input element are substantially arranged along a direction parallel to the side, the bonding region comprises a first bonding region and a second bonding region, the at least one input element is disposed between the first bonding region and the second bonding region, and the pads comprise a plurality of first pads in the first bonding region and a plurality of second pads in the second bonding region; and a flexible circuit board, having a connecting portion, wherein the connecting portion is extended and attached to the bonding region, and a plurality of terminals of the connecting portion is respectively and electrically connected to the pads.

16. An electronic apparatus, comprising:
a casing, having an opening;
a main module, disposed in the casing;
a display module, disposed in the casing, wherein the opening exposes a display surface of the display module;
a touch panel, disposed on the display surface, wherein the touch panel comprises:
- a sensing array, comprising a plurality of sensing units;
- a plurality of first connection lines and a plurality of second connection lines, disposed outside the sensing array, and respectively and electrically connected to the corresponding sensing units to enable the sensing units;
- at least one input element, disposed outside the sensing array and close to a side of the touch panel; and
- a plurality of pads, disposed in a bonding region of the touch panel, and respectively and electrically connected to the corresponding first connection lines and the corresponding second connection lines, wherein the bonding region is close to the side of the touch panel, the bonding region and the at least one input element are substantially arranged along a direction parallel to the side, the bonding region comprises a first bonding region and a second bonding region, the at least one input element is disposed between the first bonding region and the second bonding region, and the pads comprise a plurality of first pads in the first bonding region and a plurality of second pads in the second bonding region; and a flexible circuit board, electrically connected between the main module and the touch panel, wherein the flexible circuit board has a connecting portion, the connecting portion is extended and attached to the bonding region, and a plurality of terminals of the connecting portion is respectively and electrically connected to the pads.

* * * * *